United States Patent Office 3,082,112
Patented Mar. 19, 1963

3,082,112
METHOD FOR IMPROVING PHYSICAL PROPERTIES OF CLAYS AND CLAY-CONTAINING SOILS AND COMPOSITIONS RESULTING THEREFROM (6A-3SA-1,3-B)
John B. Hemwall, Long Beach, Calif., assignor to The Dow Chemical Company, Midland, Mich., a corporation of Delaware
No Drawing. Filed May 3, 1961, Ser. No. 107,322
8 Claims. (Cl. 106—287)

This invention concerns compositions and methods for the treatment of clays and clay-containing soils having at least 5 weight percent clay, dry basis, with a 6-alkyl-3-(substituted alkyl) - 3,4 - dihydro - 2H-1,3-benzoxazine (hereafter 6A-3SA-1,3-B) having the formula:

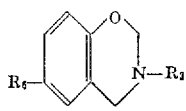

wherein $R_3$ is a member of the group consisting of —$CH_2CH_2OH$, —$CH_2COOH$ and alkali metal and ammonium salts of the latter, and $R_6$ is a member of the group consisting of alkyl groups containing from 1 to 12 carbon atoms, cyclohexyl and phenyl. The invention particularly concerns treating clays and clayey soils for the controlled fracturing of crust-forming soils in agriculture.

Clays and clay-containing soils are widespread, occurring naturally in various geological deposits, including soil. They have the properties of being dimensionally unstable and of forming fluid cohesive and adhesive mixtures in the presence of water. Conversely, upon drying, they become extremely stress resistant. While many of the uses of clays and clayey soils depend upon these properties, they are frequently a distinct handicap in agriculture. Thus, clay-containing soils which have been exposed to rain or irrigation water and subsequently dried often will form crusts through which plant penetration is very difficult or impossible.

For agricultural purposes, it is impossible to avoid the use of a clay-containing soil where it exists, except to retire it from agricultural production. Frequently, however, the crusting problem with such soils is mitigated by the use of crops which are more capable of penetrating through crusts, or by planting several seeds together so that by their combined effort at least one plant will emerge, or by transplanting seedlings, in which case the plant does not need to penetrate the crusted soil surface. In many cases these are quite satisfactory solutions to the crusting problem. In other cases, however, these techniques impose restrictions on the grower that he would prefer to avoid. The other alternative used, of course, is to proceed in the hope that conditions necessary to crust formation do not occur before the plants have penetrated the soil surface. While this is frequently the case, there are numerous times when it is not, and severe losses to the farmer result. Thus, there is a definite need for clays and clayey soils, which, after natural or artificial watering and then drying, form crusts which fracture more readily than untreated clays and clayey soils. Such treated clays and clayey soils can be considered to be less water sensitive than the corresponding untreated soils.

This invention is particularly concerned with the treatment of clays and clay-containing soils having at least 5 weight percent, dry basis, of a naturally occurring clay, e.g., of the kaolinitic, montmorillonitic, illitic or mixed layer type, with a 6A-3SA-1,3-B compound, as specified above, in an amount ranging between about 0.0025 and 2 weight percent, dry clay basis, to improve their physical properties for agricultural purposes.

By way of illustration, the following sorts of 6A-3SA-1,3-B compounds can be used in the practice of this invention:

6-tert-butyl-3,4-dihydro-2H-1,3-benzoxazine-3-ethanol
6-tert-butyl-3,4-dihydro-2H-1,2-benzoxazine-3-acetic acid
6-dodecyl-3,4-dihydro-2H-1,3-benzoxazine-3-ethanol
6-phenyl-3,4-dihydro-2H-1,3-benzoxazine-3-ethanol
6-cyclohexyl-3,4-dihydro-2H-1,3-benzoxazine-3-ethanol
6-(1,1,3,3-tetramethylbutyl)-3,4-dihydro-2H-1,3-benzoxazine-3-ethanol They may be prepared following procedures similar to those shown in Journal of the American Chemical Society, 74:1518 (1952).

The 6A-3SA-1,3-B compound can be applied to the clays and clay-containing soil in several ways. The preferred way involves dispersing the 6A-3SA-1,3-B compound either as a suspension or as a solution in a liquid medium and admixing the resulting liquid dispersion with the clay-containing soil via spraying, slurrying or other suitable methods. Suitable liquids for dispersion have a boiling point up to ca. 150° C. and include water, ketones, alcohols and hydrocarbon solvents, mixtures thereof and emulsions thereof, either oil-in-water or water-in-oil.

Because of the diverse nature of the 6A-3SA-1,3-B compound utilized in the practice of this invention, some types of compounds are soluble, dispersible or emulsifiable in relatively hydrophilic media, others in relatively hydrophobic media. Upon inspection of a chemical formula, the art skilled can generally determine a solvent, dispersion medium or emulsifier satisfactory for a given 6A-3SA-1,3-B compound. In any event, the operability and desirability of a given solvent, dispersion medium or emulsifying agent can be determined by a simple test wherein a given 6A-3SA-1,3-B compound is dissolved, suspended or its solution emulsified in a given medium. Obviously, solvents, diluents and emulsifying agents are used which are inert toward the 6A-3SA-1,3-B compound. Hereinafter, such solutions, suspensions and emulsions will sometimes be referred to broadly as dispersions and the solvent, suspension and emulsion media will be referred to broadly as dispersion media. Advantageously, the 6A-3SA-1,3-B compound dispersion contains between 0.0025 and 50 weight percent of 6A-3SA-1,3-B compound.

The treatment of the clay or clay-containing soil with the 6A-3SA-1,3-B compound should result in the clay or clay-containing soil containing at least 0.0025% and advantageously up to 2% by weight of the 6A-3SA-1,3-B compound, dry clay basis. The upper limit is essentially economic. The 6A-3SA-1,3-B compounds used for agricultural purposes need be applied only to the actual volume of soil being cultivated. Thus, when a 6A-3SA-1,3-B compound is used to decrease soil crusting, it is practical to treat only the soil immediately above the seed row. Depending upon how carefully the 6A-3SA-1,3-B compound is applied to this restricted volume of soil, anywhere from 0.1 pound to 10 pounds of the 6A-3SA-1,3-B compound is sufficient to treat one acre of crop land.

The modulus of rupture (MR) is a test to determine the maximum stress that a material will withstand without breaking and is determined by subjecting a rectangular briquette to a bending moment. This test is commonly accepted by soil scientists as a measure of the crusting potential of a soil and, hence, its relative suitability as an agricultural soil. The lower the maximum stress before rupture, the less the crusting potential of the soil.

The MR was determined on an apparatus patterned after that as described and used by L. A. Richards in the Soil Science Society of America Proceedings, 17: 321–323.

In each set of determinations conducted to provide the data for the following examples, one control was included. The control was prepared in a manner exactly analogously to the other treatments except that no 6A-3SA-1,3-B compound was used.

The following examples describe completely specific embodiments and the best mode contemplated by the inventor for carrying out his invention. They are not to be construed as limiting the invention, which is defined in the claims.

EXAMPLE 1

A series of samples of finely ground, air-dried, slightly acid, clay loam soil was brought up to a moisture content of about 17% by spraying water as a fine mist onto the soil samples while subjecting them to thorough mixing. Various 6A-3SA-1,3-B compounds, as indicated in following Table I, were immediately added in series to the soil samples by spraying with and mixing in 5 to 10 ml. of an acetone solution containing 20 mg. of the 6A-3SA-1,3-B compound per 100 g. of air-dried soil to provide a treated soil containing 200 p.p.m. of 6A-3SA-1,3-B compound on a dry soil weight basis.

Once the soil had been treated, it was allowed to stand in the open air for at least two hours and then was dried in an oven at 30° C. overnight. The heated soil was then divided into replicates of 25 to 30 g. each and placed into two rectangular molds 3.2 cm. wide by 6.4 cm. long. The soil in the molds was then leveled and compacted with a special compacting tool. The compacting tool has a base which covers the leveled soil sample and onto which was dropped a weight of 31.5 g. from a height of 31.5 cm. This weight was dropped repeatedly for six times, after which the soil was flooded with water. After the excess water had drained through the soil, the samples were dried overnight in an oven at 30° C. The resulting briquettes were then tested by the method cited above for their MR.

MR determinations, as described above, were carried out on the treated samples and untreated control with the following results:

Table I

| 6A-3SA-1,3-B compound: | MR in millibars |
|---|---|
| Control | 3033 |
| 6 - phenyl - 3,4 - dihydro-2H-1,3-benzoxazine-3-ethanol | 1033 |
| 6 - cyclohexyl - 3,4 - dihydro-2H-1,3-benzoxazine-3-ethanol | 950 |
| 6 - (1,1,3,3 - tetramethylbutyl) - 3,4 - dihydro-2H-1,3-benzoxazine-3-ethanol | 0 |

EXAMPLE 2

The procedure of Example 1 was repeated with another similar soil sample with the following results:

Table II

| 6A-3SA-1,3-B compound: | MR in millibars |
|---|---|
| Control | 2350 |
| 6 - tert - butyl - 3,4 - dihydro-2H-1,3-benzoxazine-3-ethanol | 0 |

EXAMPLE 3

The procedure of Example 1 was repeated with another similar soil sample with the following results:

Table III

| 6A-3SA-1,3-B compound: | MR in millibars |
|---|---|
| Control | 3250 |
| 6 - tert - butyl - 3,4 - dihydro-2H-1,3-benzoxazine-3-acetic acid | 0 |
| 6 - dodecyl - 3,4 - dihydro-2H-1,3-benzoxazine-3-ethanol | 0 |

EXAMPLE 4

Several 100 g. samples of a finely ground, air-dried, slightly acid, clay loam soil were brought up to a moisture content of about 17%. Various weights of 6A-3SA-1,3-B compound, as indicated (5 mg., 10 mg., 50 mg., 100 mg.), were dissolved in 10 ml. aliquots of acetone and sprayed with intimate mixing onto separate samples of soil.

The soil was then evaluated by MR determinations, as given in following Table IV:

Table IV

| 6A-3SA-1,3-B Compound | p.p.m. in soil | MR in millibars |
|---|---|---|
| Control | | 5,800 |
| 6-tert-butyl-3,4-dihydro-2H-1,3-benzoxazine-3-ethanol. | 50 | 3,760 |
| | 100 | 3,280 |
| | 500 | 0 |
| | 1,000 | 0 |

EXAMPLE 5

Several finely ground, air-dried samples of several soils were brought up to the moisture content indicated in following Table V–A. An amount of 40 mg. of 6A-3SA-1,3-B compound dissolved in 10 ml. of acetone was sprayed with intimate mixing onto one sample of each soil. Thus, each soil contained 400 p.p.m. of the test chemical.

The soil was then evaluated by MR determinations, as described above. Results are given in following Table V–B.

Table V–A
SOILS USED

| Soil | Mechanical analysis | | | Percent O.M.[1] | pH | Moisture content at treatment in percent |
|---|---|---|---|---|---|---|
| | Sand | Silt | Clay | | | |
| B-1 | 26 | 52 | 22 | 10.7 | 5.3 | 20 |
| D-1 | 42 | 46 | 12 | 1.0 | 6.0 | 7 |
| F-3 | 38 | 36 | 26 | 0.9 | 6.7 | 8 |
| N-1 | 13 | 39 | 48 | 2.7 | 6.8 | 12 |
| L-1 | 5 | 35 | 60 | 2.1 | 7.4 | 18 |

[1] Organic matter.

Table V–B

| Soil | MR in millibars | |
|---|---|---|
| | 6A-3SA-1,3-B Compound [1] | Control |
| B-1 | 160 | 560 |
| D-1 | 0 | 840 |
| F-3 | 0 | 1,720 |
| N-1 | 0 | 2,900 |
| L-1 | 0 | 7,120 |

[1] 6-tert-butyl-3,4-dihydro-2H-1,3-benzoxazine-3-ethanol.

What is claimed is:

1. The method of treatment of clays and clay-containing soils containing at least 5 weight percent clay, soil basis, by admixing therewith a dispersion, in an inert liquid dispersion medium having a boiling point up to about 150° C., of a compound having the formula:

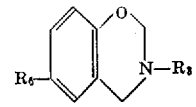

wherein $R_3$ is a member of the group consisting of —$CH_2CH_2OH$, —$CH_2COOH$ and alkali metal and ammonium salts of the latter, and $R_6$ is a member of the group consisting of alkyl groups containing from 1 to 12 carbon atoms, cyclohexyl and phenyl in amount sufficient to provide at least 0.0025 weight percent of said compound, dry clay basis.

2. A composition of a clay material of the group consisting of clays and clay-containing at least 5 weight percent clay, soil basis, and soils containing in admixture therewith at least 0.0025 weight percent, clay basis, of a compound having the formula:

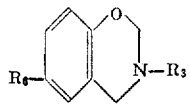

wherein $R_3$ is a member of the group consisting of —$CH_2CH_2OH$, —$CH_2COOH$ and alkali metal and ammonium salts of the latter, and $R_6$ is a member of the group consisting of alkyl groups containing from 1 to 12 carbon atoms, cyclohexyl and phenyl.

3. The composition of Claim 2 wherein the compound is 6-tert-butyl-3,4-dihydro-2H-1,3-benzoxazine-3-ethanol.

4. The composition of claim 2 wherein the compound is 6-tert-butyl-3,4-dihydro-2H-1,3-benzoxazine-3 - acetic acid.

5. The composition of claim 2 wherein the compound is 6-dodecyl-3,4-dihydro-2H-1,3-benzoxazine-3-ethanol.

6. The composition of claim 2 wherein the compound is 6-phenyl-3,4-dihydro-2H-1,3-benzoxazine-3-ethanol.

7. The composition of claim 2 wherein the compound is 6-cyclohexyl-3,4-dihydro-2H-1,3-benzoxazine-3-ethanol.

8. The composition of claim 2 wherein the compound is 6-(1,1,3,3-tetramethylbutyl)-3,4-dihydro-2H-1,3 - benzoxazine-3-ethanol.

References Cited in the file of this patent

UNITED STATES PATENTS

| 2,768,089 | Erickson | Oct. 23, 1956 |
| 2,831,779 | Erickson | Apr. 22, 1958 |
| 2,864,717 | Lyons | Dec. 16, 1958 |

OTHER REFERENCES

Martin, Soil Science Society of America Proceedings, volume 17, No. 1, January 1953, pages 1–9.

UNITED STATES PATENT OFFICE

CERTIFICATE OF CORRECTION

Patent No. 3,082,112                      March 19, 1963

John B. Hemwall

It is hereby certified that error appears in the above numbered patent requiring correction and that the said Letters Patent should read as corrected below.

Column 2, line 5, for "2-benzoxazine" read -- 3-benzoxazine --; column 4, line 74, after "clay-containing" insert -- soils containing --; line 75, strike out "soils containing".

Signed and sealed this 19th day of November 1963.

(SEAL)
Attest:

ERNEST W. SWIDER                      EDWIN L. REYNOLDS

Attesting Officer                      Acting Commissioner of Patents